US009235640B2

(12) United States Patent
Kern et al.

(10) Patent No.: US 9,235,640 B2
(45) Date of Patent: Jan. 12, 2016

(54) LOGGING BROWSER DATA

(71) Applicant: International Business Machines Corporation, Armonk, NY (US)

(72) Inventors: Steven M. Kern, Vail, AZ (US); Jeffrey R. Placer, Tucson, AZ (US); Benjamin J. Randall, Tucson, AZ (US); Jacob A. Stevens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 13/675,892

(22) Filed: Nov. 13, 2012

(65) Prior Publication Data

US 2013/0073950 A1    Mar. 21, 2013

Related U.S. Application Data

(63) Continuation of application No. 13/038,687, filed on Mar. 2, 2011, now Pat. No. 8,326,922, and a continuation of application No. 12/350,324, filed on Jan. 8, 2009, now Pat. No. 7,962,547.

(51) Int. Cl.
| | |
|---|---|
| *G06F 15/16* | (2006.01) |
| *G06F 17/30* | (2006.01) |
| *H04L 29/06* | (2006.01) |
| *G06F 12/00* | (2006.01) |

(52) U.S. Cl.
CPC .......... *G06F 17/30861* (2013.01); *H04L 29/06* (2013.01)

(58) Field of Classification Search
USPC ........................................ 709/223–229, 250
See application file for complete search history.

(56) References Cited

U.S. PATENT DOCUMENTS

| | | | |
|---|---|---|---|
| 7,143,347 B2 | 11/2006 | Su | |
| 7,299,403 B1 * | 11/2007 | Cleasby et al. | 715/738 |
| 7,698,633 B2 | 4/2010 | Rojer | |
| 7,962,547 B2 * | 6/2011 | Kern et al. | 709/203 |
| 8,326,922 B2 * | 12/2012 | Kern et al. | 709/203 |
| 2002/0199190 A1 * | 12/2002 | Su | 725/37 |
| 2003/0195963 A1 * | 10/2003 | Song et al. | 709/227 |
| 2005/0066037 A1 | 3/2005 | Song et al. | |
| 2005/0204047 A1 | 9/2005 | Mitchell et al. | |
| 2006/0112328 A1 | 5/2006 | Rojer | |
| 2007/0050703 A1 | 3/2007 | Lebel | |

(Continued)

FOREIGN PATENT DOCUMENTS

| | | |
|---|---|---|
| JP | 2004062873 A | 2/2004 |
| JP | 2006172440 A | 6/2006 |
| JP | 2012008853 | 1/2012 |

OTHER PUBLICATIONS

Shegalov, German, EOS, Exactly-Once E-Service Middleware, University of Saarland, Germany, pp. 1043-1046, Aug. 23, 2002.

(Continued)

*Primary Examiner* — Zarni Maung
(74) *Attorney, Agent, or Firm* — Kunzler Law Group

(57) ABSTRACT

For logging browser data, the method compiles a string representing metadata of an operating environment for a browser displaying webpage content from a Web server. The method further compiles a Document Object Model (DOM) string representing at least one DOM element of the webpage content. In addition, the method logs the metadata string and the DOM string within a data store accessible by the web server.

20 Claims, 3 Drawing Sheets

(56) References Cited

U.S. PATENT DOCUMENTS

| | | |
|---|---|---|
| 2008/0005281 A1 | 1/2008 | Hsueh et al. |
| 2008/0005793 A1 | 1/2008 | Wenig et al. |
| 2008/0282175 A1 | 11/2008 | Costin et al. |
| 2009/0164395 A1 | 6/2009 | Heck |
| 2009/0210781 A1 | 8/2009 | Hagerott et al. |

OTHER PUBLICATIONS

International Search Report and Written Opinion, PCT/EP2009/066502, Apr. 20, 2010.

* cited by examiner

LOGGING BROWSER DATA

CROSS-REFERENCE TO RELATED APPLICATIONS

This is a continuation application of and claims priority to U.S. patent application Ser. No. 13/038,687 entitled "METHOD FOR SERVER-SIDE LOGGING OF CLIENT BROWSER STATE THROUGH MARKUP LANGUAGE" filed on Mar. 2, 2011 for Steven M. Kern which is incorporated herein by reference.

FIELD

The present invention generally relates to data tracking and storage operations involving web servers and client browser interfaces. The present invention more specifically relates to an operation which enables logging and server-side access for data obtained from a client browser.

BACKGROUND

Many of today's user interfaces are websites, requiring the use of a browser to access the interface content. However, different browsers may display the same content differently to the client users. For example, Microsoft Internet Explorer and Mozilla FireFox each implement the XML DOM (Document Object Model) differently. In addition, through use of dynamic web page technologies such as JavaScript or AJAX, the content that the user is currently viewing may have been modified from its original state as provided by the server. Accordingly, it is often difficult to determine exactly what a client is doing and how the content is being displayed to the client, because the client code is executing on a different system than the web server. This can make problem determination particularly difficult, especially when trying to understand errors or other unexpected behavior that is occurring on the client end.

In order to provide a robust problem determination solution in existing systems, browser-side logging must be implemented on the client computer to record exactly what the user is seeing and doing. This typically involves recording all values that the user might have input into controls, and tracking every change that scripts have made to the displayed content. There is currently no system for efficiently recording comprehensive client-side browser display information at a point in time and conveying this information back to the server or another third party for analysis.

BRIEF SUMMARY

One aspect of the present invention includes enhanced operations which enable server-side logging of a client browser state. In one embodiment, by traversing and recording the contents of the DOM (Document Object Model), the complete current state of a webpage as accessed by a client user can be written to a string of characters. This includes any data entered into input widgets, and any modifications made to the page by scripting. This string containing data representing the state of the webpage can be then passed to the server, and logged using standard logging methods. Accordingly, the logged information can be parsed and analyzed to recreate the state of the client browser as existing at the time of logging.

The use of the presently disclosed logging operations enable a content provider to know exactly what a user was doing, and what was being displayed to the user, at any given point in time. Therefore, the disclosed logging operations enable: debugging of content-generating script code; identification of rendering issues occurring in a particular browser or version of a browser; determination of values entered into a webpage if some non-validated input results in unexpected behavior; identification of "cache" problems, such as where client-side scripting files are out-of-date and need to be refreshed (or served with content-no-cache); and overall auditing of the content being rendered to the user. Further, the presently disclosed embodiments enable troubleshooters and support personnel to exactly recreate a scenario that the user was in, without needing access to the web server or its databases.

In one embodiment, an operation for performing server-side logging of a client browser state is performed for a browser operating on a client computer system after webpage content is received from a web server. After this webpage content is displayed in the browser, a state of the webpage as displayed within the browser is captured.

Upon capture, the operating environment of the browser is compiled into a string. Additionally, a string representing each DOM element of the captured state of the webpage is created by traversing each DOM element of the page and compiling each DOM element and its associated data into a string. In a further embodiment, the state of the webpage as displayed within the browser includes input values that were provided by a user into input fields.

The metadata and DOM string data is then sent to the web server. In a further embodiment, this string is sent within a HTTP request. Once the web server has received the string, it can then process it as necessary, such as logging the metadata and DOM information into a data store accessible by the web server.

In further embodiments, the state of the webpage is captured at different times or in response to specific events. For example, the webpage capture may occur: immediately after webpage content is displayed in the browser; responsive to an execution of a script by the client browser; responsive to receiving a signal from a user that the state of the webpage should be logged (such as through a button or menu-driven command by the user); or alternatively from scripting executed within the webpage which determines when to capture the state of the webpage.

DETAILED DESCRIPTION

Figure 1:
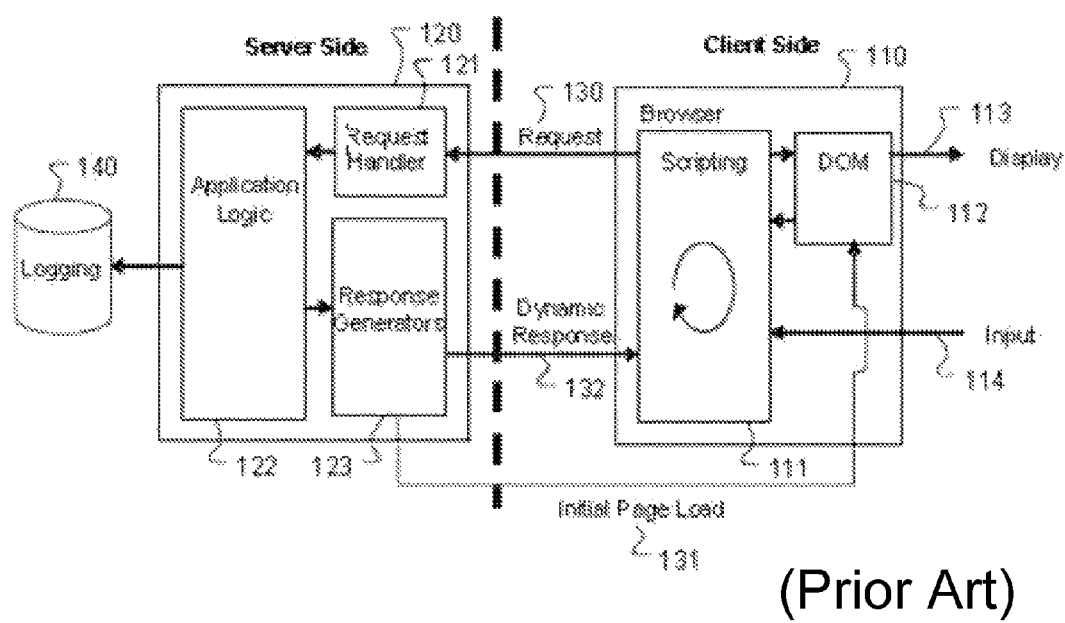
FIG. 1 illustrates an example web client/server architecture as existing in the prior art.

One aspect of the present invention involves the logging of a client browser state and the transmission of this logged browser state data to a web server for analysis and use with problem determination, support, and testing purposes. In one embodiment, the client browser state is captured into a string comprising metadata and HTML. The HTML captured within the logged data represents the "run-time," dynamically generated HTML of a page rather than the "source" HTML that was originally served to the client. The metadata may include data such as the browser name, browser version, window size, and operating system. After the client browser state and metadata is captured into a string, this string is transmitted to the web server and/or a third party location.

With use of the captured browser state information, support teams can exactly reproduce the state of a user interface as experienced by the user at the moment the browser state was logged. For example, this may include user-entered values of webpage input fields, or the state of a content display that was dynamically changed within the browser. The logging operation may be triggered manually by a user command, such as with a "log browser state" button, or may be triggered at pre-defined intervals defined in a script. In a further embodiment, conditions may be applied during the capture of the client browser state to prevent logging of sensitive data on the client webpage, such as user-entered password fields.

Standard logging practices within the prior art are not capable of easily logging a comprehensive state of the client and its browser, particularly when attempting to monitor the display of a webpage that is rendered differently to numerous types of browsers and browser platforms. One of the advantages of the present invention is that logging and problem determination may be deployed and/or coordinated for both server- and client-side state data. Moreover, the embodiments of the present invention allow capturing of the exact rendered HTML regardless of whether the content was generated server- or client-side.

Additionally, in one embodiment of the present invention, an administrator is able to analyze logging for data that the user has entered into input widgets of the page, even if this data has not yet been submitted to the server. Unlike existing systems that use screen captures, this embodiment does not store pixel-data. Instead, the markup is stored as text, which saves space and is more conducive to examination. Conceivably, a markup "screenshot" could even be captured for every user action performed. Because the scripting system could be configured to save the state of the page at regular intervals, this would enable "video-like" playback of client use with significantly reduced overhead versus saving actual video data.

By capturing the display as the webpage is rendered on the client, the various embodiments of the present invention may be executed upon a wide variety of client platforms which utilize basic web browsing activities. This includes commonly used browsers operating on a desktop computer, in addition to other browsers operating on phones, mobile devices, and portable electronic computing devices. Thus, the logging of data may be uniformly performed and collected from the client whether the client browser is Firefox, Internet Explorer, Safari, Google Chrome, etc.

As illustrated by an example web server architecture existing in the prior art in FIG. 1, dynamic web applications are typically structured as follows. When the URL of the browser 110 is pointed at the server 120, it forms an initial request 130 which the server 120 processes in a request handler 121. The server's response 131 that is created from the application logic 122 and the response generators 123 of the web server constitutes the initial load of the page. Generally the response takes the form of providing an HTML page for display 113, but the response theoretically could provide any type of file represented by a document object model (DOM).

Once the page is loaded, the browser 110 begins executing any scripts 111 associated with the page. These scripts can perform a number of tasks, such as animating contents of the page, monitoring and responding to user input, or making additional requests to the server for more data. In the latter case, a script may form a request which is sent to the server, processed, and a dynamic response 132 is sent directly back to the page's script via a callback function.

Any of these actions may result in the script 111 updating the DOM 112. Additionally, user input 114 modifies the DOM as well. Thus, with a typical client/web server configuration, there is no obvious way for the server to know the exact state of a rendered page at a given time. The only data which may be easily captured on the server-side in a logging data store 140 would be data requests or responses as communicated through the server 120.

Figure 2:
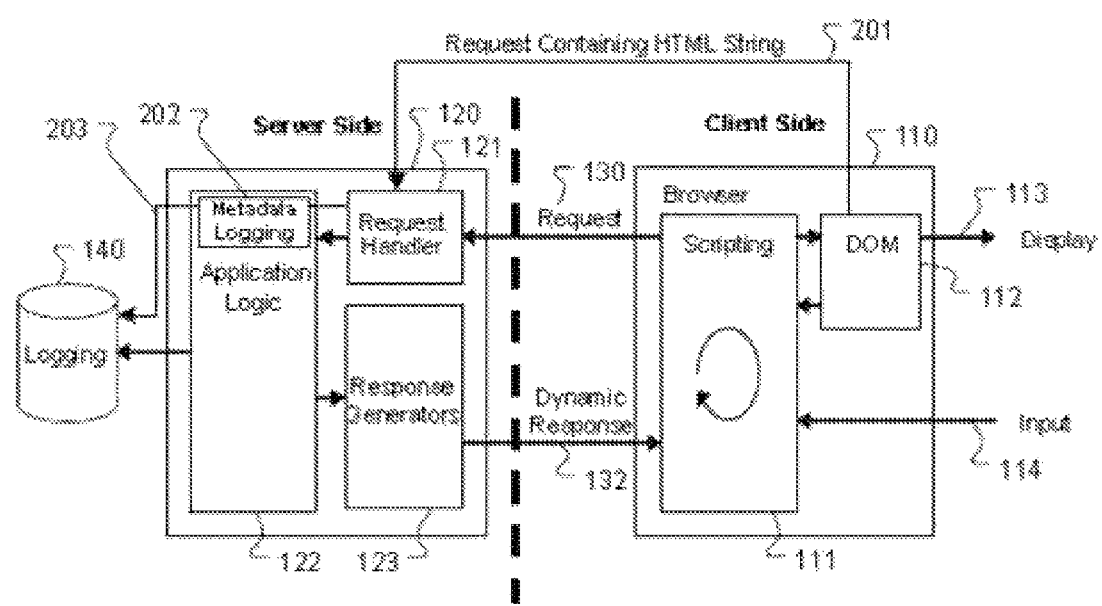
FIG. 2 illustrates an example web client/server architecture implementing logging of a client browser state in accordance with one embodiment of the present invention.

FIG. 2 illustrates a similar web client/server architecture that implements server-side logging of a client browser state in accordance with one embodiment of the present invention. The following operation provides one example of a method which captures client data and transmits the client data to the server for logging on the server side.

First, the logging operation is started within the client side browser 110 to capture the displayed webpage DOM. The logging operation may be initiated in numerous ways, such as by having the browser user signal that the state of the display should be logged. This signal could be performed, for example, by clicking a button within the browser 110. Alternatively, the logging may be triggered by scripting 111 executing within the page which determines that the state of the page should be logged, based on a pre-defined interval or predicate.

Additionally, as part of capturing the state of the client browser, the scripting system 111 also determines meta-information relevant to the display of the webpage, such as the current browser version, screen resolution, operating system version, and the like. This metadata information is captured and represented in a string.

Next, the scripting system 111 visits each DOM element of the webpage. For each element within the DOM 112, HTML is written to a string that represents the element. For example, if a table element is encountered within the DOM, a <table> tag is written. The data contained in each element is written to the string as well. In further embodiments, if the element is considered "sensitive," such as a password field, then the field will not be read to prevent the sensitive data from being logged. As shown in operation 201, the string containing a combination of the metadata information and the browser DOM HTML is then sent to the server via a request that indicates a browser state save.

After processing the request within the request handler 121 at the server, logic within a metadata logging function 202 further processes the client state-saved metadata and HTML for storage in within a logging data store 140 in operation 203. Subsequently, any user with access to the server's logging data store 140 can open the saved data, and, by using a browser version indicated within the metadata, view exactly what the user was viewing at the time of the state save.

One skilled in the art would recognize that the browser state logging and data collection techniques within the scope of the present invention may be accomplished within numerous server-side environments, such as either the simple web server depicted in FIG. 2, or may be combined with a large combination of advanced data storage, retrieval, and analysis technologies. Particularly, the logging operations may be accomplished to produce data that is stored within a managed storage environment, such as a storage area network (SAN), network attached storage (NAS) devices, backup utilities and appliances, and other storage resources.

Additionally, the data that is collected from the client-side browsers may be selected, launched, recreated, and utilized within the operation of automated testing environments, a hypervisor, or other virtual environments. For example, the logging may be retrieved and reconstructed within a remote virtual machine client to provide a realistic simulation of the client's browser experience within a virtual setting.

Two non-limiting examples follow which demonstrate additional applications and uses of the previously described logging operation. As a first example, the browser state logging operation may be executed immediately after serving a PHP or JSP page from the web server. This would allow for exact analysis of server-generated HTML as received by the client, and enable verification that the server-side logic and scripts are operating in an intended fashion.

As a second example, the browser state logging operation may be executed after a JavaScript event has been triggered or some specific JavaScript code has been executed. One reason to trigger a logging operation upon the occurrence an event is to obtain an accurate snapshot of currently selected radio buttons, form values, and the like. This would assist troubleshooting in the event that any of the webpage inputs are causing an error or unexpected behavior.

Figure 3:
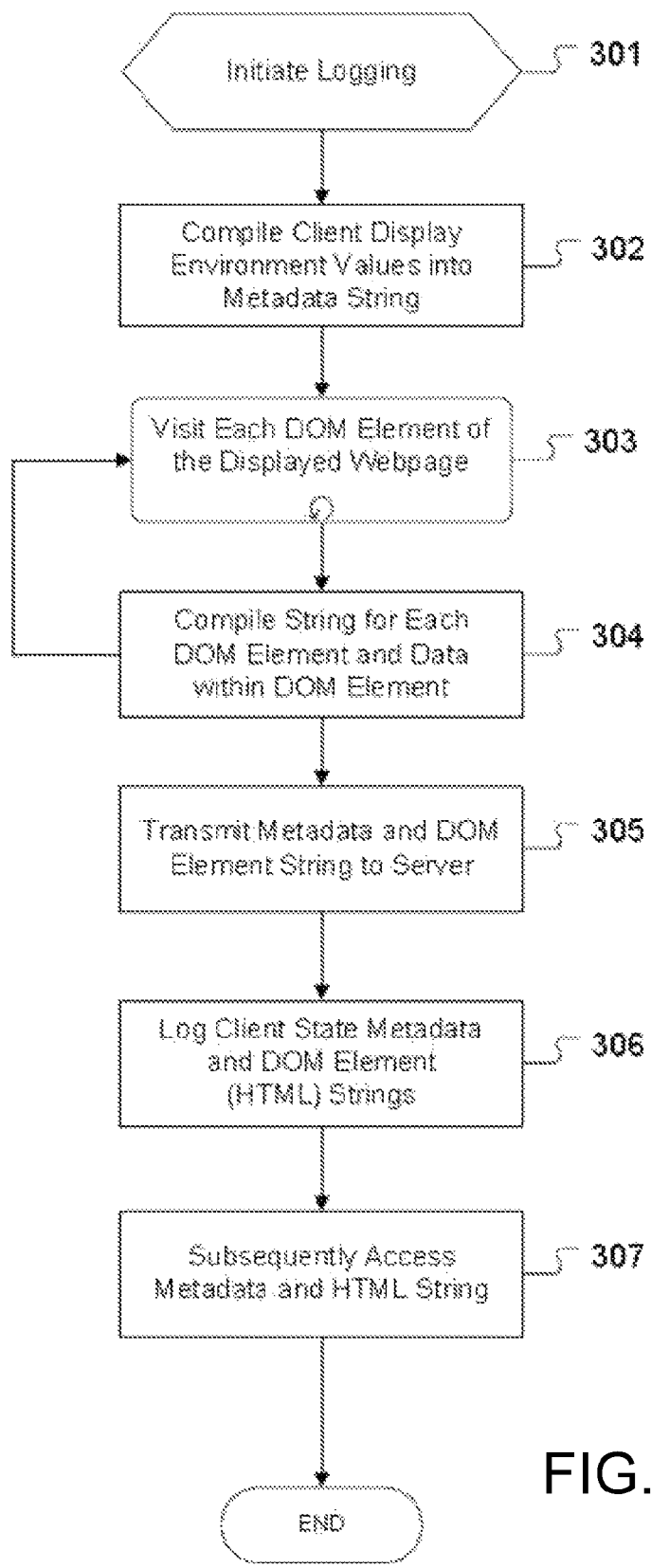
FIG. 3 illustrates a flowchart of an example method for performing the server-side logging of a client browser state in accordance with one embodiment of the present invention.

FIG. 3 illustrates a flowchart of an example operation for performing server-side logging of a client browser state through markup language in accordance with one embodiment of the present invention. First, as in step 301, the logging operation is initiated. The logging operation may be manually initiated by a user, may be automatically initiated at some defined time period, or in response to the execution of pre-defined logic such as in a script.

Next, as in step 302, the scripting system determines relevant metadata information about the webpage and the client display environment, such as the current browser, screen resolution, and operating system. This information is compiled and stored in a textual format.

Next, as in step 303, the scripting system traverses each DOM element of the displayed webpage. As in step 304, for each DOM element, HTML is compiled into a string that represents the element and its data. For example, if a table element is encountered, a <table> tag is written, and the text or any other data contained the element is written to the string. Rules may also be defined to exclude the collection of data from elements such as password fields.

As in step 305, the string representing a browser state containing the client display environment metadata information, and the compiled string containing a representation of the webpage DOM in HTML, is transmitted to the server via a HTTP request. As in step 306, the server logs, through whatever storage method is configured for the data, the state-saved metadata and HTML strings into its configured data store.

Finally, as in step 307, the metadata and HTML strings may be accessed for further analysis. For example, the browser indicated by the metadata may be deployed to view exactly what the user was viewing at the time of the state save. The appropriate analysis, testing, and/or development changes may be performed to remedy unexpected or unintended webpage behavior.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for logging browser data, comprising:
compiling, by use of a processor, a string representing metadata of an operating environment for a first browser operating on a first computer system and displaying webpage content from a web server;
compiling a Document Object Model (DOM) string representing at least one DOM element of the webpage content;
logging the metadata string and the DOM string within a data store accessible by the web server; and recreating a simulation of a state of the webpage content from the metadata and the DOM string, the simulation displayed in a second browser operating on a second computer system.

2. The method of claim 1, further comprising capturing the metadata and the at least one DOM element of the webpage content responsive to the webpage content being displayed in the first browser.

3. The method of claim 1, further comprising capturing the metadata and the at least one DOM element of the webpage responsive to an execution of a script by the first browser.

4. The method of claim 1, further comprising capturing the metadata and the at least one DOM element of the webpage responsive to receiving a signal that the metadata and the at least one DOM element of the webpage should be logged.

5. The method of claim 1, further comprising capturing the metadata and the at least one DOM element of the webpage responsive to a script executed within the webpage content.

6. The method of claim 1, wherein the metadata string and the DOM string further comprise input values received in response to the webpage content.

7. The method of claim 1, wherein the metadata string and DOM string are sent to the web server within a HyperText Transfer Protocol (HTTP) request.

8. A system, comprising:
at least one processor; and
at least one non-transitory memory which stores instructions operable with the at least one processor, the instructions being executed for:
compiling a string representing metadata of an operating environment for a first browser operating on a first computer system and displaying webpage content from a web server;
compiling a Document Object Model (DOM) string representing at least one DOM element of the webpage content; and
logging the metadata string and the DOM string within a data store accessible by the web server; and
recreating a simulation of a state of the webpage content from the metadata and the DOM string, the simulation displayed in a second browser operating on a second computer system.

9. The system of claim 8, the instructions further executed for capturing the metadata and the at least one DOM element of the webpage content responsive to the webpage content being displayed in the first browser.

10. The system of claim 8, the instructions further executed for capturing the metadata and the at least one DOM element of the webpage responsive to an execution of a script by the first browser.

11. The system of claim 8, the instructions further executed for capturing the metadata and the at least one DOM element of the webpage responsive to receiving a signal that the metadata and the at least one DOM element of the webpage should be logged.

12. The system of claim 8, the instructions further executed for capturing the metadata and the at least one DOM element of the webpage responsive to a script executed within the webpage content.

13. The system of claim 8, wherein the metadata string and the DOM string further comprise input values received in response to the webpage content.

14. The system of claim 8, wherein the metadata string and DOM string are sent to the web server within a HyperText Transfer Protocol (HTIP) request.

15. A computer program product comprising a non-transitory computer readable storage medium having a computer readable program, wherein the computer readable program when executed on a computer causes the computer to:
compile a string representing metadata of an operating environment for a first browser operating on a first computer system and displaying webpage content from a web server;
compile a Document Object Model (DOM) string representing at least one DOM element of the webpage content;
log the metadata string and the DOM string within a data store accessible by the web server; and
recreating a simulation of a state of the webpage content from the metadata and the DOM string, the simulation displayed in a second browser operating on a second computer system.

16. The computer program of claim 15, the computer further capturing the metadata and the at least one DOM element of the webpage content responsive to the webpage content being displayed in the first browser.

17. The computer program of claim 15, the computer further capturing the metadata and the at least one DOM element of the webpage responsive to an execution of a script by the first browser.

18. The computer program of claim 15, the computer further capturing the metadata and the at least one DOM element of the webpage responsive to receiving a signal that the metadata and the at least one DOM element of the webpage should be logged.

19. The computer program of claim 15, the computer further capturing the metadata and the at least one DOM element of the webpage responsive to a script executed within the webpage content.

20. The computer program of claim 15, wherein the metadata string and the DOM string further comprise input values received in response to the webpage content.

* * * * *